Sept. 11, 1928.
H. E. INGRAM
ANALYSIS CHART
Filed Aug. 3, 1926
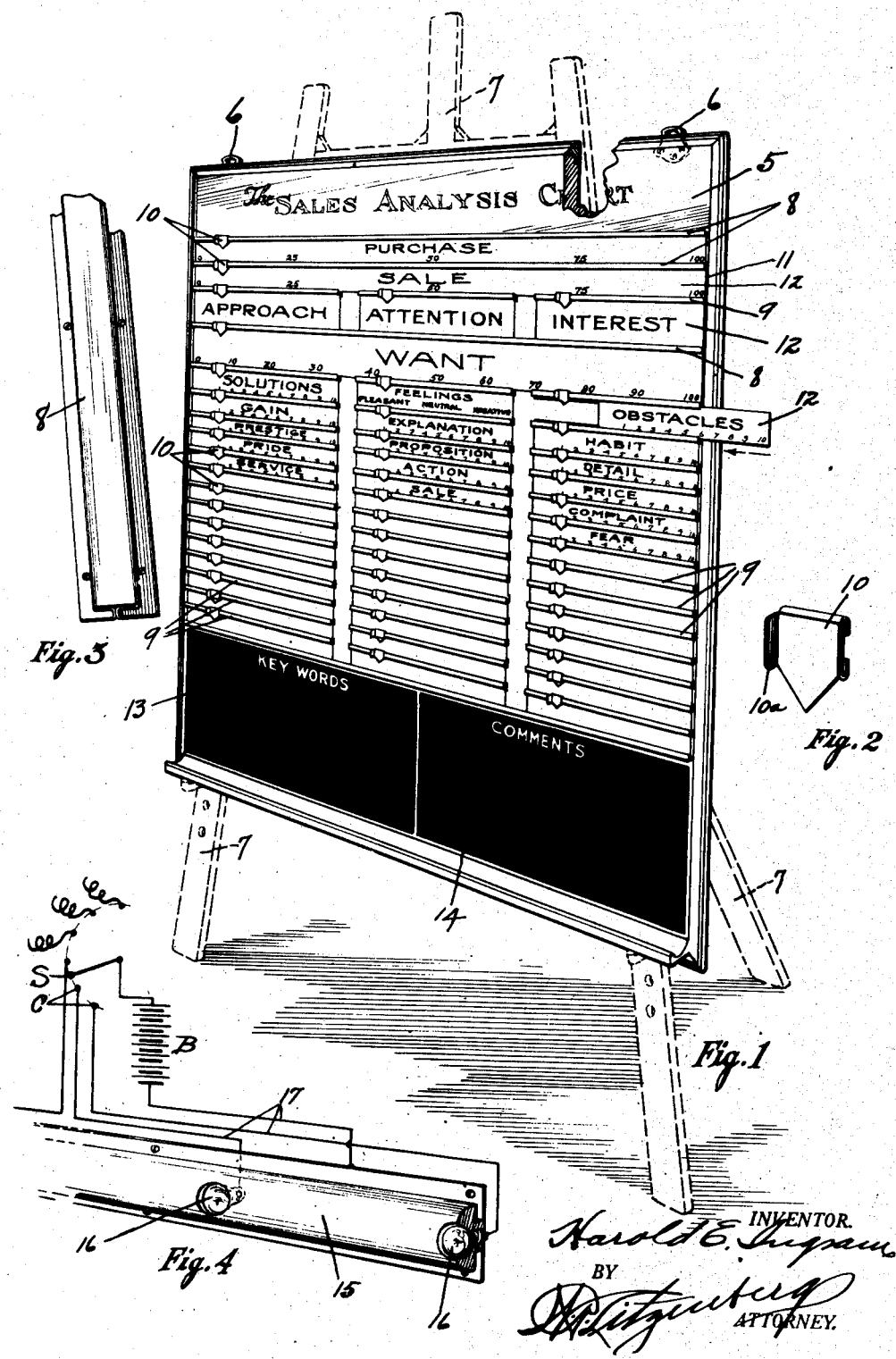

Patented Sept. 11, 1928.

1,683,827

UNITED STATES PATENT OFFICE.

HAROLD E. INGRAM, OF BURLINGAME, CALIFORNIA.

ANALYSIS CHART.

Application filed August 3, 1926. Serial No. 126,837.

My invention has among its salient objects to provide a chart or board having connected therewith means for representing or indicating with physical instrumentalities the mental reaction taking place between a speaker and an auditor, a teacher and his pupils, a salesman and a buyer, and for indicating the weight or force of the words used, the reactions taking place or resulting from the use of certain words or expressions, and by means of which it is possible to indicate progress or lack of progress made in conveying a message, teaching a lesson, or in making a sale.

In all conversation, a speaker conveys thoughts by words and desires a certain reaction or result on the part of a hearer, and it is possible for an experienced person to determine by certain attitudes, replies, or reactions whether or not he is making progress, and one of the objects and purposes of my invention is to provide a chart or apparatus by means of which pupils can be taught to evaluate words, expressions or attitudes as they listen and watch a lecturer, teacher or salesman. That is, as a conversation or dialogue takes place, the pupils who are listening and watching the chart are taught to analyze the mental processes taking place. The chart or apparatus, as it is being manipulated or operated also increases the degree of concentration of those who are listening and watching.

In order to more fully explain my invention, I have illustrated on the accompanying sheet of drawings one practical form or embodiment thereof, which I will now describe.

Figure 1 is a perspective view of a chart embodying my invention;

Figure 2 is a detail showing one of the movable indicators;

Figure 3 is a fragmentary view of one of the division members which carries the indicator and also forms a part of the card-receiving channel or pocket; and Figure 4 is a fragmentary view of a modified means for indicating progress by using a series of lamps to be illuminated successively instead of moving an indicator.

Referring now more in detail to the drawings, I will describe the embodiment of my invention shown for explanatory purposes. A chart or board, 5, is provided, either with hanging means, as 6, 6, or a supporting easel, 7, whereby the board or chart can be conveniently placed before a class. The board as here shown, is provided with a series of cross bars or members, as 8 and 9, shown in detail in Fig. 3, and some of them being long enough to extend across the board, as are those marked 8, and some are shorter, as are those marked 9. Slidably mounted on these cross members are indicators, as 10, Fig. 2, with the wing, 10ᵃ, with which said indicators can be moved at will along said bars or cross members. The form of said cross members is such, as will be clear from Fig. 3, that when two of them are placed parallel with each other and close enough together, there is formed therebetween a card receiving pocket, 11, into which cards, 12, can be placed to form, with the indicators, 10, means for indicating different degrees of feeling, action, condition, or the like, as the case may be, said cards being name cards and also having indicated thereon graduations for indicating different degrees as the indicator is moved therealong.

In the top card pocket, the card bears the title "Purchase" while the next card below bears the tile "Sale". Supposing the chart is being used in a class in salesmanship, and one person takes the part of a salesman and the other takes the place of a buyer. As the conversation or dialogue takes place, the indicators can be moved along the cross members according as the salesman succeeds in making a sale, or, perchance the buyer makes a purchase, whereby the class can readily determine whether a sale has been made, or a purchase has been made, or to what degree either or both has been made.

In the next pocket are three cards bearing the tiles "Approach", "Attention", and "Interest", with indicators to be moved along each card, and these indicators are moved during the conversation, dialogue, or other effort to indicate to the class the progress made or lack of progress; that is, if the salesman makes a good, bad, or ordinary approach, the indicator is moved along by the teacher, or operator of the device. As attention is secured or interest is awakened during the conversation or effort, the class notes the particular words, or the "key word" which secured the attention, or awakened the interest, and this is written on the black-board, 13, which has the title "Key Words", or other "comments" can be made on the black-board, 14.

When a buyer raises certain objections, such as "we are satisfied with our present methods" the indicator over "Habit" can be moved one point on the obstacle side of the chart to indicate that the habit objection has been put forth once. As the salesman attempts to overcome the objection by saying certain words to show the buyer the gain which is possible for him, the indicator on the solution side of the chart is moved forward once over the word "Gain", and so on when the objection of price, or complaint is made and these are met or offset by the salesman as he presents from the solution side of the chart the "Prestige" or the "Service", or other advantages to be had. As the sale progresses, a need, desire or want is built up or not by the salesman. If a want is developed, or a need, the indicator over the word "Want" is moved along to the degree that the analyst or analysts determine progress has been made.

As certain words in all conversation are more important than others in gaining influence, or a desired reaction, the words are written down by the analyst under "Key words." They can then be reconsidered and valued after the interview and the class studies the chart and the various adjustments made to indicate or picture the mental process which took place during the conversation, or sales effort.

If the salesman uses certain words that show he is attempting to make the buyer give him an order, the indicator over the word "Action" is moved along. All buyers have certain feelings or attitudes toward the salesman and his product, house, etc. As these are shown by words, actions, etc., the indicator over the word "Feelings" can be moved to register over the words "Pleasant", "Neutral" or "Negative", as the case may be.

Thus the chart can be used in a class on salesmanship to secure a high degree of attention or concentration, to register the various mental processes taking place during the salesmanship demonstration, and the kind of progress made, if any, the degree of interest developed, to what degree the sale was completed, the objections raised, the solutions offered, the attitude or feelings of the buyer, etc. During the progress of the demonstration, the chart shows at all times the opinion of the analyst as to the progress of the sale. Under the title "Comments" on the blackboard 14, he can write his opinion as to the tact of the salesman, his skill in speaking, managing his prospect, poise, confidence, actions, looks, etc.

While I have explained the chart in a form particularly designed for use in a salesmanship class, it is to be understood that it can be used for other purposes and so arranged as to data that it can be used in the same or a similar manner to picture the mental reactions, conditions, accomplishments and success in the effort made, and I do not, therefore, limit the invention to the specific form or embodiment shown for descriptive purposes, except as I may be limited by the hereto appended claims.

As another possible means for indicating different positions along the cards or word containing areas, I have shown in Fig. 4 how the cross members can be provided with electric lights with means for selectively illuminating the same for indicating purposes. The cross member is designated, 15, with lights, 16, 16, spaced therealong, with circuit wires, 17, forming a circuit for each light, from a battery, B, and with a switch element, S, operating on contact elements, C, whereby the movement of the switch member, S, manually operates to complete circuits to said lamps, 16, 16, as will be readily understood. Thus small lights can be used to designate progress, or to selectively designate the words which express the mental action or reaction, as expressed on the chart. Other changes in details within the scope of the invention are possible.

I claim:

1. A device of the character referred to for graphically indicating the kind and degree of mental action and reaction during a conversation, said device having thereon as a part thereof words expressive of various actions, conditions and mental attitudes, and separate movable means associated with each word and operable for selectively indicating said words for the purposes referred to.

2. A device for graphically indicating different kinds of mental actions, said device having thereon words expressing kinds of mental actions, and movable indicating means associated with each of said words for selectively designating the kind of mental action.

3. A device for analyzing mental processes including a chart provided with means for expressing kinds and degrees of mental actions, attitudes and reactions, and movable physical means permanently connected with each for selectively designating the kinds and degrees of mental actions, attitudes and reactions, said other means being manually operable.

4. A device of the character referred to including in combination a board, a series of headings thereon expressing different actions, conditions and mental attitudes, and words expressing kinds and degrees of solutions, feelings and obstacles, and manually operable means associated with each heading and word for selectively designating certain of said headings and words for record purposes.

5. Means for recording kinds and degrees of mental processes during a conversation including printed words expressive thereof, controllable means for indicating various kinds and degrees of mental attitudes and reactions as expressed by said printed words, and manually operable means for selectively operating said controllable means during the conversation.

6. In a device of the character shown and described, in combination, a board, a series of cross members, a series of names between said cross members, indicating means associated with said cross members for selectively designating thereon and in different degrees conditions expressed by said names, and a writing surface for receiving written matter.

7. In an analysis chart of the character shown and described, in combination, a board, a series of word containing areas, indicator means attached to said chart and permanently associated with said word containing areas and operable to indicate different degrees of advance along said areas, said indicator means being manually controlled whereby to indicate different positions along a word containing area, for the purpose indicated.

Signed at Los Angeles, Los Angeles County, California, this 29th day of July, 1926.

HAROLD E. INGRAM.